US011948788B2

(12) United States Patent
Haufler et al.

(10) Patent No.: US 11,948,788 B2
(45) Date of Patent: Apr. 2, 2024

(54) TOF MASS CALIBRATION

(71) Applicant: DH TECHNOLOGIES DEVELOPMENT PTE. LTD., Singapore (SG)

(72) Inventors: Robert E. Haufler, Toronto (CA); William M. Loyd, Sugar Land, TX (US); Takashi Baba, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 289 days.

(21) Appl. No.: 17/310,989

(22) PCT Filed: Jun. 10, 2020

(86) PCT No.: PCT/IB2020/055464

§ 371 (c)(1),
(2) Date: Sep. 3, 2021

(87) PCT Pub. No.: WO2020/250157

PCT Pub. Date: Dec. 17, 2020

(65) Prior Publication Data

US 2022/0093383 A1 Mar. 24, 2022

Related U.S. Application Data

(60) Provisional application No. 62/860,300, filed on Jun. 12, 2019.

(51) Int. Cl.
*H01J 49/40* (2006.01)
*H01J 49/00* (2006.01)

(52) U.S. Cl.
CPC .......... *H01J 49/40* (2013.01); *H01J 49/0031* (2013.01); *H01J 49/0036* (2013.01)

(58) Field of Classification Search
CPC ..... H01J 49/40; H01J 49/0031; H01J 49/0036
(Continued)

(56) References Cited

U.S. PATENT DOCUMENTS

2012/0261568 A1* 10/2012 Coon .................... G16B 40/10 250/288
2014/0306106 A1 10/2014 Olney
(Continued)

FOREIGN PATENT DOCUMENTS

WO 0070649 A1 11/2000

OTHER PUBLICATIONS

International Search Report and Written Opinion for PCT/IB2020/055464, dated Sep. 16, 2020.
(Continued)

*Primary Examiner* — Nicole M Ippolito
(74) *Attorney, Agent, or Firm* — Kasha Law LLC; John R. Kasha; Kelly L. Kasha

(57) ABSTRACT

A calibration apparatus for a mass analyzer includes an ion source device and a dual-purpose electron beam generating unit. The ion source device ionizes an analyte of a sample, producing analyte ions. The dual-purpose electron beam generating unit is positioned between the ion source device and the mass analyzer. In a first mode, the dual-purpose electron beam generating unit is used to create fragments of analyte ions of unknown mass-to-charge ratio. In a second mode, the dual-purpose electron beam generating unit is used to create ions of calibration compounds of known mass-to-charge ratio. All ions are subsequently transferred to the mass analyzer.

15 Claims, 10 Drawing Sheets

(58) Field of Classification Search
USPC ......................... 250/281, 282, 283, 287, 288
See application file for complete search history.

(56) References Cited

U.S. PATENT DOCUMENTS

2016/0148791 A1 5/2016 Bloomfield et al.
2018/0045679 A1 2/2018 Carver et al.
2021/0343518 A1* 11/2021 Pophristic ........... H01J 49/0409

OTHER PUBLICATIONS

Pu, Y. et al., Separation and identification of isomeric glycans by selected accumulation-trapped ion mobility spectrometry-electron activated dissociation tandem mass spectrometry, Analytical Chemistry, 2016, vol. 88, No. 7, pp. 3440-3443 (internal pp. 1-9).

* cited by examiner (PROR ART)

300

(PROR ART)

TOF MASS CALIBRATION

RELATED APPLICATIONS

This application claims the benefit of U.S. Provisional Patent Application Ser. No. 62/860,300, filed on Jun. 12, 2020, the content of which is incorporated by reference herein in its entirety.

INTRODUCTION

The teachings herein relate to calibration apparatus for a mass analyzer of a mass spectrometer. More specifically, an electron-based dissociation (ExD) cell is positioned between an ion source and a mass analyzer and is used to transmit or fragment analyte ions for mass analysis and then also to ionize a gas of the ExD cell, producing calibrant ions for mass analysis.

The apparatus described herein can be used in conjunction with a processor, controller, or computer system, such as the computer system of FIG. 1.

Dissociation Techniques Background

Electron-based dissociation (ExD) and collision-induced dissociation (CID) are often used as dissociation techniques for tandem mass spectrometry (mass spectrometry/mass spectrometry (MS/MS)). ExD can include, but is not limited to, electron capture dissociation (ECD) or electron transfer dissociation (ETD). CID is the most conventional technique for dissociation in tandem mass spectrometers.

Mass Analyzer Calibration Background

Mass analyzers, such as time-of-flight (TOF), Fourier transform ion cyclotron resonance (FTICR) mass analyzers, and orbi-trap mass analyzers, are capable of providing highly accurate mass measurements. However, this level of accuracy requires a level of instrument stability and repeatability that can easily be affected by fluctuations in ambient temperature, spectrometer chamber pressures, and applied voltages. To account for these fluctuations, mass analyzers are calibrated using masses that are known in a process referred to as mass calibration.

Traditionally, known compounds, also referred to as calibrants or lock masses, have been analyzed either in conjunction or sequentially with samples of unknown compounds or compounds of interest (analytes). In one method, calibrants are mixed with the analytes in solution prior to ionization in the ion source. This method, however, can result in contamination by the calibrants in the transfer lines in capillary tips. The calibrants can also suppress the ionization efficiency of the analytes.

As a result, other methods of introducing calibrants into the mass spectrometer or producing calibrants in the mass spectrometer have been developed. For example, a calibration delivery system (CDS) can be used to introduce two or more compounds including a calibrant compound into the ion source chamber simultaneously. Unfortunately, however, such CDS systems require replication of sample probes and injectors, a complex ion source interface, and adaptation specifically for electrospray ionization (ESI) sources.

In order to produce a calibrant in a mass spectrometer, a dynamic background calibration system (DBS) can be used. In a DBS, background ions present in the mass spectrometer are used as the calibrants. Unfortunately, however, a DBS can only be used for calibration in mass spectrometry (MS) mode. In other words, a DBS cannot be used for mass spectrometry/mass spectrometry (MS/MS) mode where the background ions would be fragmented and, therefore, not useful for calibration.

U.S. Pat. No. 6,797,947 (hereinafter the "'947 patent") describes another method for introducing calibrants into the mass spectrometer. In this method, a dedicated lock mass source and dedicated lock mass ionization source are positioned adjacent to the ion optics located between an ion source and mass analyzer.

FIG. 2 is an exemplary diagram 200 of the apparatus described in U.S. Pat. No. 6,797,947. In FIG. 2, lock mass source 225 and lock mass ionization source 235 are shown positioned adjacent to collision cell 220. Collision cell 220 is located between ion source 202 and mass analyzer 240. Lock mass ionization source 235 can ionize lock masses using photoionization, field desorption-ionization, electron ionization, or thermal ionization. Unfortunately, however, like the CDS, the method of the '947 patent increases the complexity of the mass spectrometer by introducing a calibrant source and ionization source solely for the purpose of calibration.

As a result, additional apparatus and methods are needed to enable the calibration of a mass analyzer without increasing the complexity of the mass spectrometer solely for that purpose.

SUMMARY

An apparatus, method, and computer program product are disclosed for calibrating a mass analyzer. The calibration apparatus includes an ion source device and an electron-based dissociation (ExD) cell. The ion source device ionizes an analyte of a sample, producing analyte ions. The ExD cell is positioned between the ion source device and the mass analyzer.

In single mass spectrometry (MS) mode, the ExD cell is used for calibration thusly: background gases or calibration compounds of known mass-to-charge ratio are ionized using the ExD cell operated as an electron impact ionization (EII) ion source, such ions are then introduced into the spectrometer. In EII mode, the ExD cell accelerates electrons in the ExD cell to a kinetic energy between 24 eV and 150 eV, for example.

Background gases can be residual air (oxygen, water, nitrogen), or perhaps a calibration compound can be introduced. Examples of a calibration compound include perfluoro kerosene or perfluorotributylamine.

The ExD cell, in normal operation, is switched off to allow transmission of previously ionized analyte ions of unknown mass-to-charge ratio (ions created by electrospray ionization in the ion source, MALDI ion source, atmospheric pressure chemical ionization or any other type of ion source) to be transmitted through the ExD cell, into the collision cell, then into the time-of-flight mass spectrometer (or any other spectrometer type).

During calibration, the ExD cell is switched on to create ions of known mass-to-charge ratio either present as trace background gases, or as introduced calibrants.

It is expected that the ExD cell is used as a calibration device frequently enough so that there is insufficient time to allow the mass calibration of the high-resolution mass spectrometer to change. In this way, the mass accuracy of the spectrometer is maintained to a high degree always.

In tandem mass spectrometry (MS/MS) mode, the ExD cell is used for calibration thusly: the ExD cell is used to create molecular ions of background gases or introduced calibrant using electron impact ionization (EII). In this case, it may prove advantageous to reduce the kinetic energy to increase the probability that molecular ions will be formed. The molecular ions are introduced into the collision cell with kinetic energy sufficient to cause fragmentation by collisionally induced fragmentation caused by collision between the molecular ions formed by the ExD cell and the gas in the collision cell. These fragment ions are then used to calibrate the high-resolution mass spectrometer.

This may be helpful if the collision cell causes a systematic mass shift requiring a different mass calibration in MS mode and MSMS mode.

Also, if ions are trapped or otherwise manipulated for causing additional advantages, any shifts in mass calibration can be tracked and corrected for in this way.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
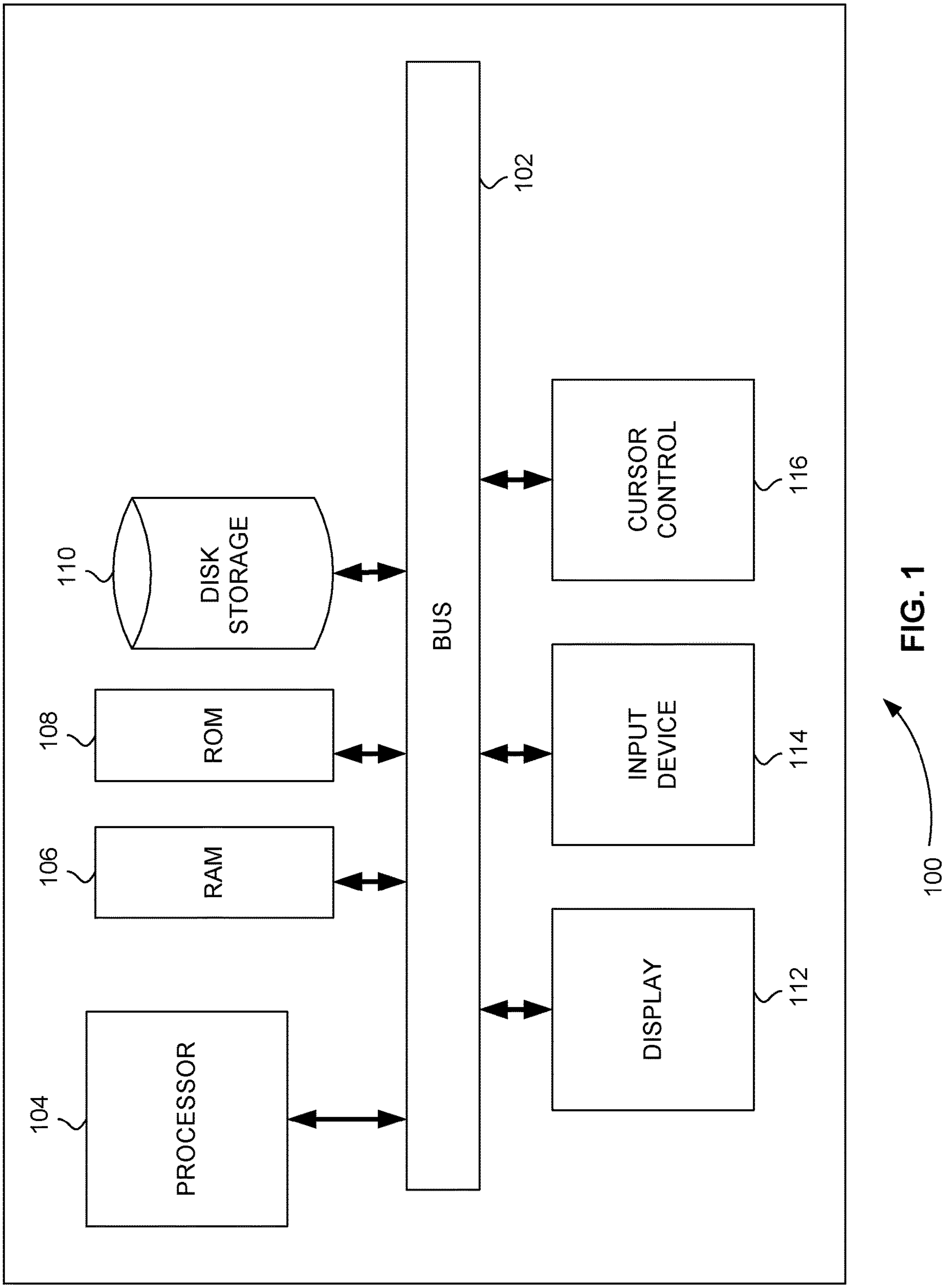
FIG. 1 is a block diagram that illustrates a computer system, upon which embodiments of the present teachings may be implemented.
Figure 2:
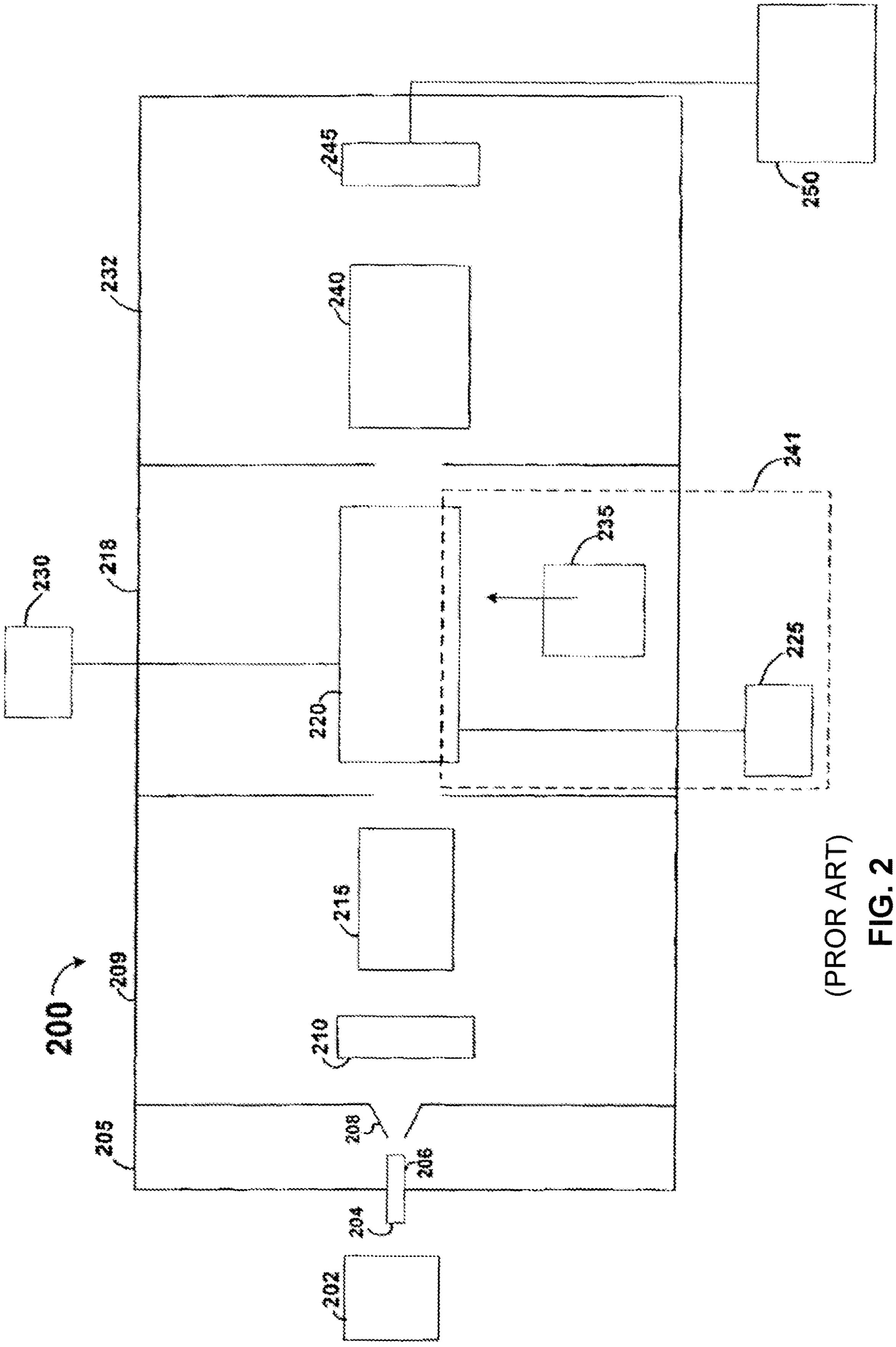
FIG. 2 is an exemplary diagram 200 of the apparatus described in U.S. Pat. No. 6,797,947.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Calibration Apparatus and Methods

Highly accurate mass analyzers, such as time-of-flight (TOF), Fourier transform ion cyclotron resonance (FTICR) mass analyzers, and orbi-trap mass analyzers require mass calibration in order to account for fluctuations in ambient temperature, spectrometer chamber pressures, and applied voltages. Traditionally, known compounds, also referred to as calibrants or lock masses, have been analyzed either in conjunction or sequentially with samples of unknown compounds or compounds of interest (analytes). Recently, other methods of introducing calibrants into the mass spectrometer or producing calibrants in the mass spectrometer have been developed.

For example, the '947 patent describes a method for introducing calibrants into the mass spectrometer where a dedicated lock mass source and dedicated lock mass ionization source are positioned adjacent to the ion optics located between an ion source and mass analyzer. Unfortunately, however, the method of the '947 patent increases the complexity of the mass spectrometer by introducing a calibrant source and ionization source solely for the purpose of calibration.

As a result, additional apparatus and methods are needed to enable the calibration of a mass analyzer without increasing the complexity of the mass spectrometer solely for that purpose.

In various embodiments, an ExD cell is positioned between an ion source and a mass analyzer and is additionally selectively operated as an electron ionization source to produce calibrant ions within the ExD cell. An ExD cell is traditionally operated in MS mode as an ion guide to transmit analyte ions on to a mass analyzer. In MS/MS mode, an ExD cell is typically used to either fragment analyte ions or transmit them on to another type of collision cell. The use of an ExD cell is now extended to ionize a gas in the ExD cell to produce calibrant ions for mass calibration.

The ExD cell can be an electron capture dissociation (ECD) device or an electron transfer dissociation (ETD) device. In a preferred embodiment, the ExD cell is an ECD-cell.

An ExD cell has traditionally not been thought of as a good device for use in ionization. Although an ExD cell uses an electron beam to dissociate ions, the electron beam is typically made up of low-energy electrons with a kinetic energy on the order of 1 eV. In contrast, one of ordinary skill in the art understands that an electron ionization source typically applies an electron beam made up of high-energy electrons with kinetic energy on the order of 70 eV.

As a result, in various embodiments, an ExD cell is modified to selectively produce an electron beam with low-energy electrons or high-energy electrons. Modifications can include, for example, providing a switchable power supply for the ExD cell.

An exemplary ExD cell is the Chimera ECD cell of SCIEX. In order to determine if an ExD cell was suitable for electron ionization, an experiment was conducted using the Chimera ECD cell. FC43 (perfluorotributylamine), a standard compound used for calibration of electron ionization (EI) mass spectrometers typically used for gas chromatography-mass spectrometry (GC-MS), was leaked into the ion path of a mass spectrometer including the Chimera ECD cell. FC43 was leaked into the ion path while the filament of the Chimera ECD cell was on and the beam energy was set to about 30 eV. The result was a significant production of ions suitable for calibration mass spectrometer in positive ion mode.

Figure 3:
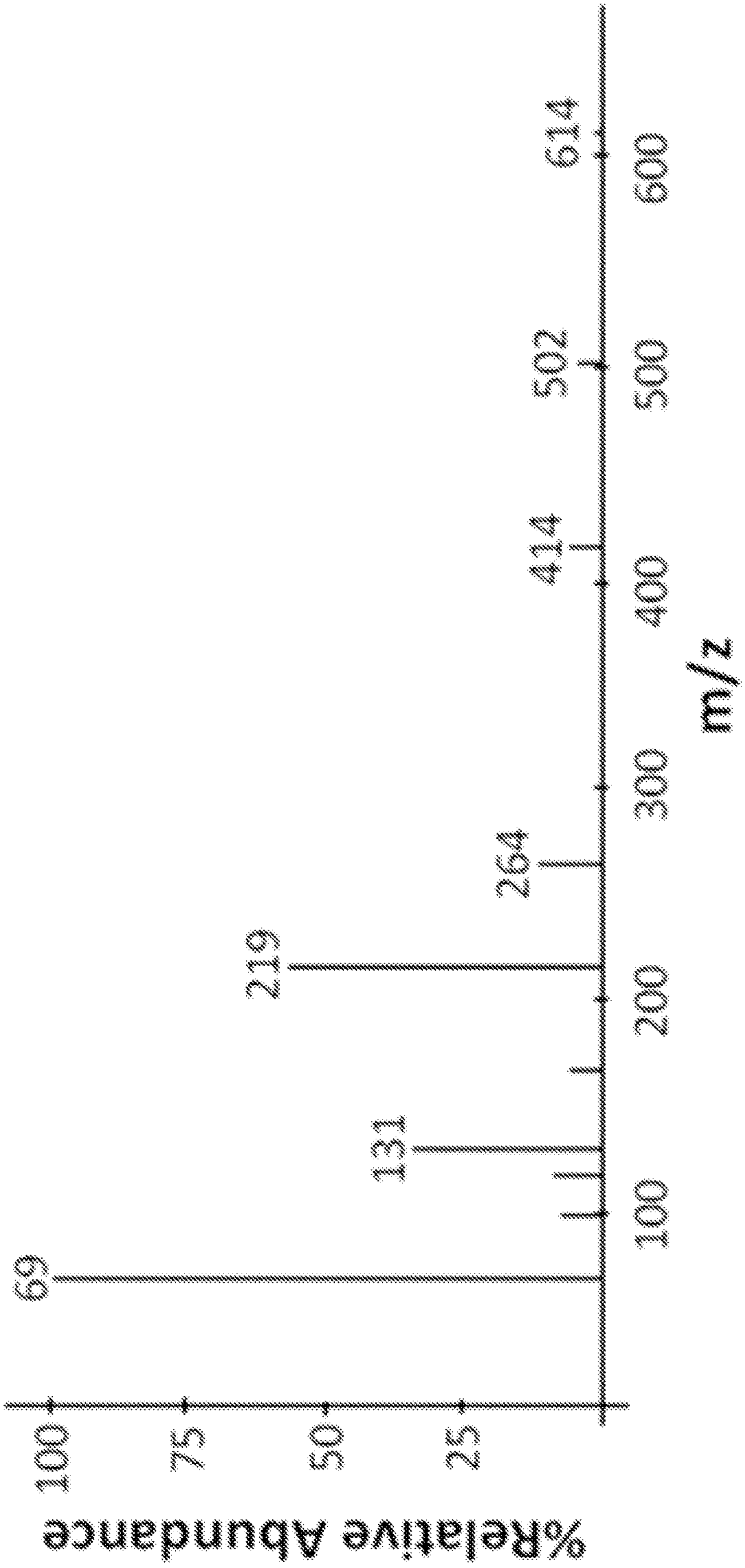
FIG. 3 is an exemplary plot of a reference spectrum for FC43 (perfluorotributylamine) produced by an electron ionization (EI) mass spectrometer operated in positive ion mode with a beam energy of about 70 eV.

FIG. 3 is an exemplary plot 300 of a reference spectrum for FC43 produced by an EI mass spectrometer operated in positive ion mode with a beam energy of about 70 eV.

Figure 4:
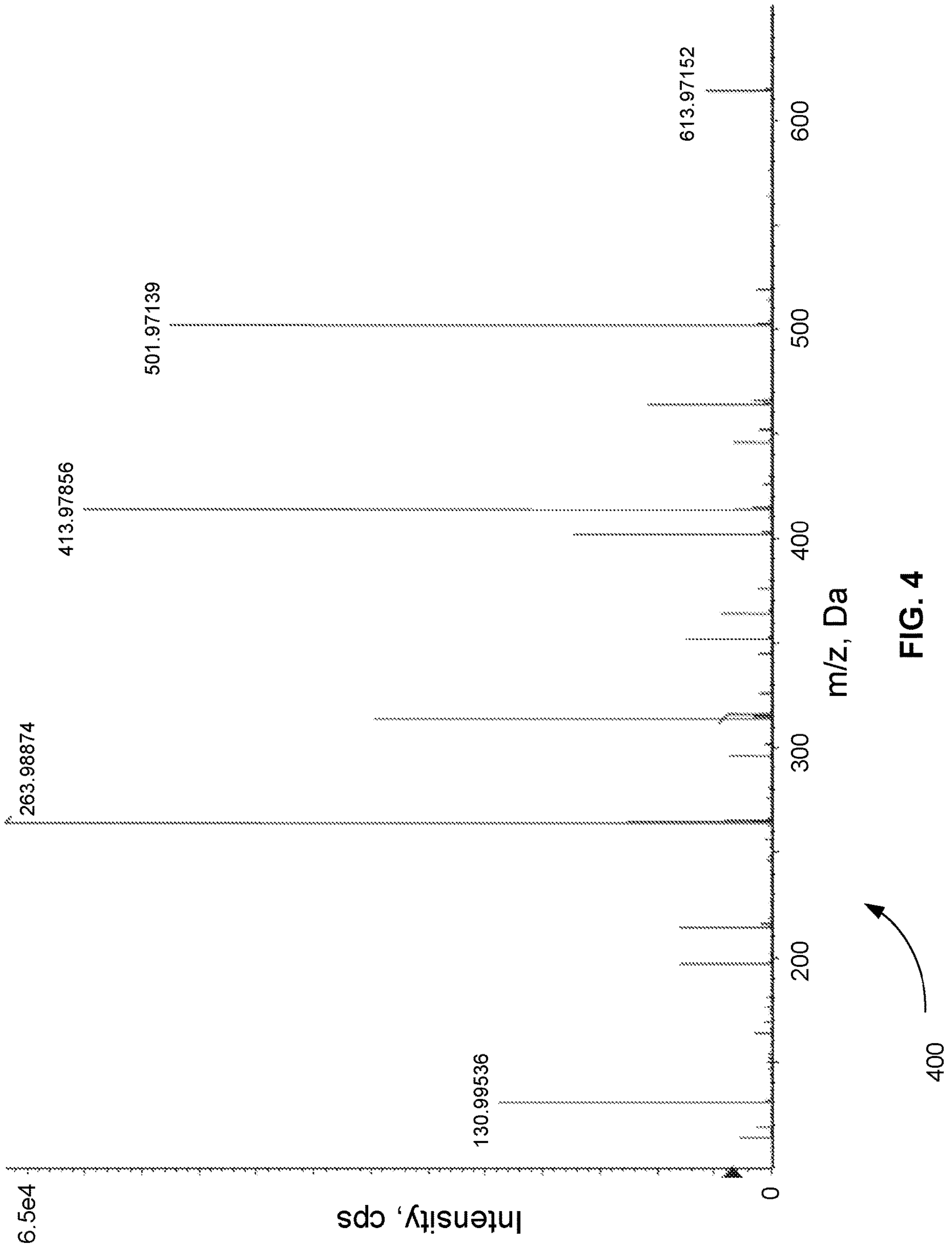
FIG. 4 is an exemplary plot of a calibration spectrum for FC43 produced by ionizing FC43 using a Chimera electron capture dissociation (ECD) cell operated in positive ion mode with a beam energy of about 30 eV, in accordance with various embodiments.

FIG. 4 is an exemplary plot 400 of a calibration spectrum for FC43 produced by ionizing FC43 using a Chimera ECD cell operated in positive ion mode with a beam energy of about 30 eV, in accordance with various embodiments. A comparison of the reference spectrum of FIG. 3 with the calibration spectrum of FIG. 4 shows that a Chimera ECD cell operated at about 30 eV can produce a significant number of ions suitable for calibration.

Figure 5:
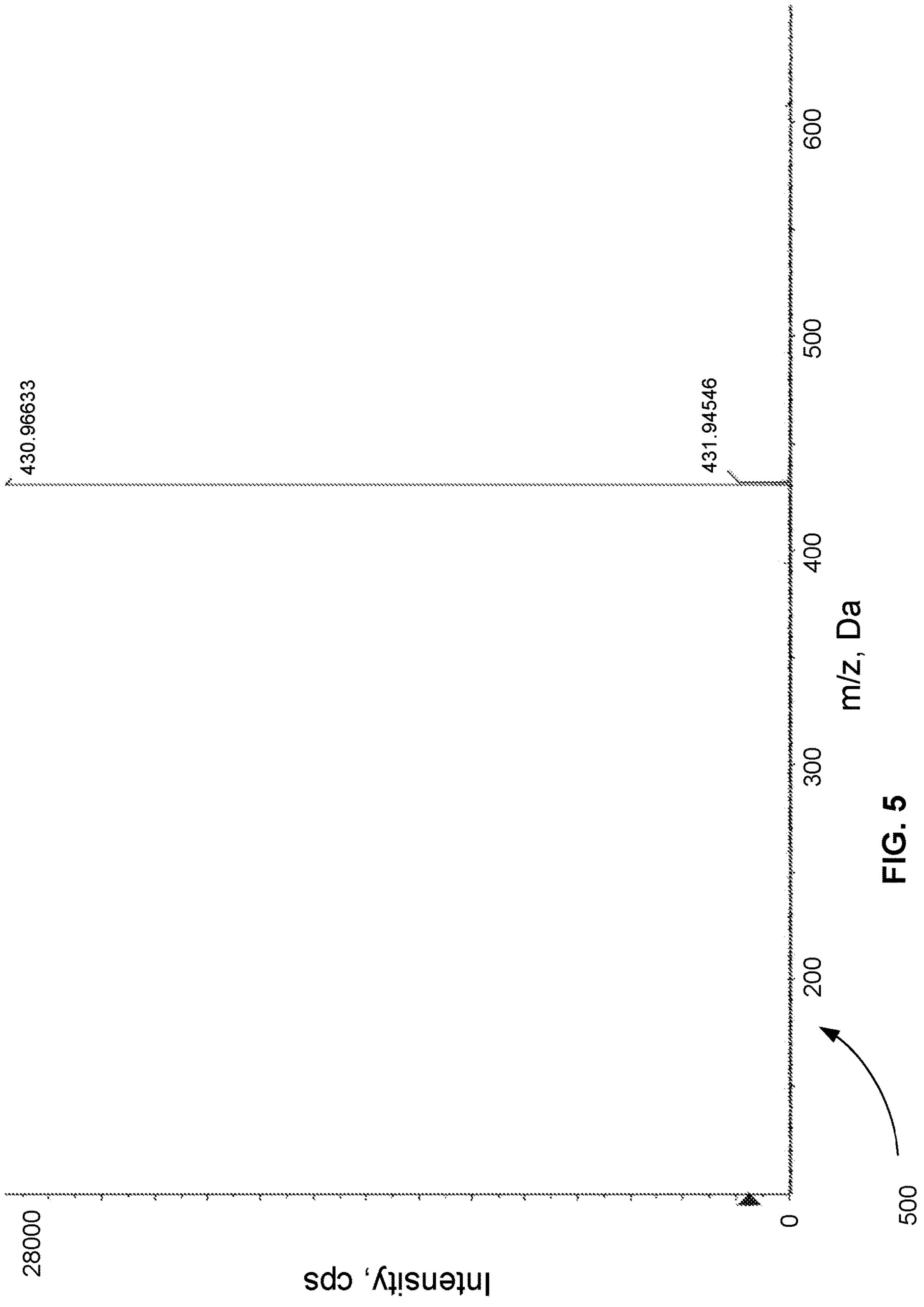
FIG. 5 is an exemplary plot of a calibration spectrum for FC43 produced by ionizing FC43 using a Chimera ECD cell operated in negative ion mode with a beam energy of about 30 eV, in accordance with various embodiments.

FIG. 5 is an exemplary plot 500 of a calibration spectrum for FC43 produced by ionizing FC43 using a Chimera ECD cell operated in negative ion mode with a beam energy of about 30 eV, in accordance with various embodiments. For negative mode, the Chimera ECD cell produced only a single FC43 ion in the calibration spectrum of FIG. 5. It is suitable to demonstrate that if a suitable compound were identified, this approach would likely produce spectra that can be used to calibrate a mass analyzer in negative mode.

In summary, FIGS. 4 and 5 show that ions that can be used for calibration can be produced in positive and negative ion mode using an ECD cell.

Figure 6:
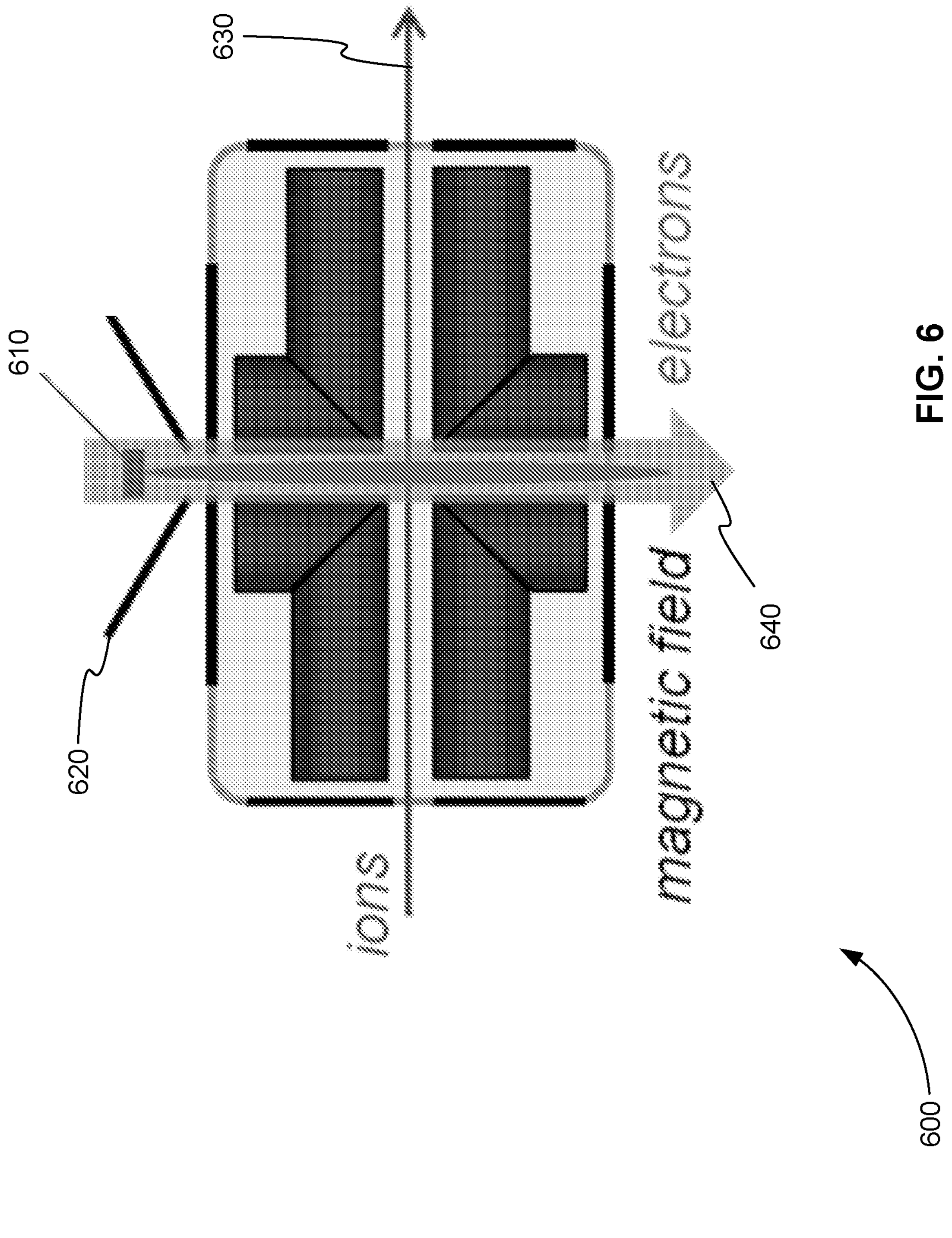
FIG. 6 is a schematic diagram of a Chimera ECD cell, in accordance with various embodiments.

FIG. 6 is a schematic diagram 600 of a Chimera ECD cell, in accordance with various embodiments. The Chimera ECD cell includes electron emitter or filament 610 and electron gate 620. Electrons are emitted perpendicular to the flow of ions 630 and parallel to the direction of magnetic field 640.

Figure 7:
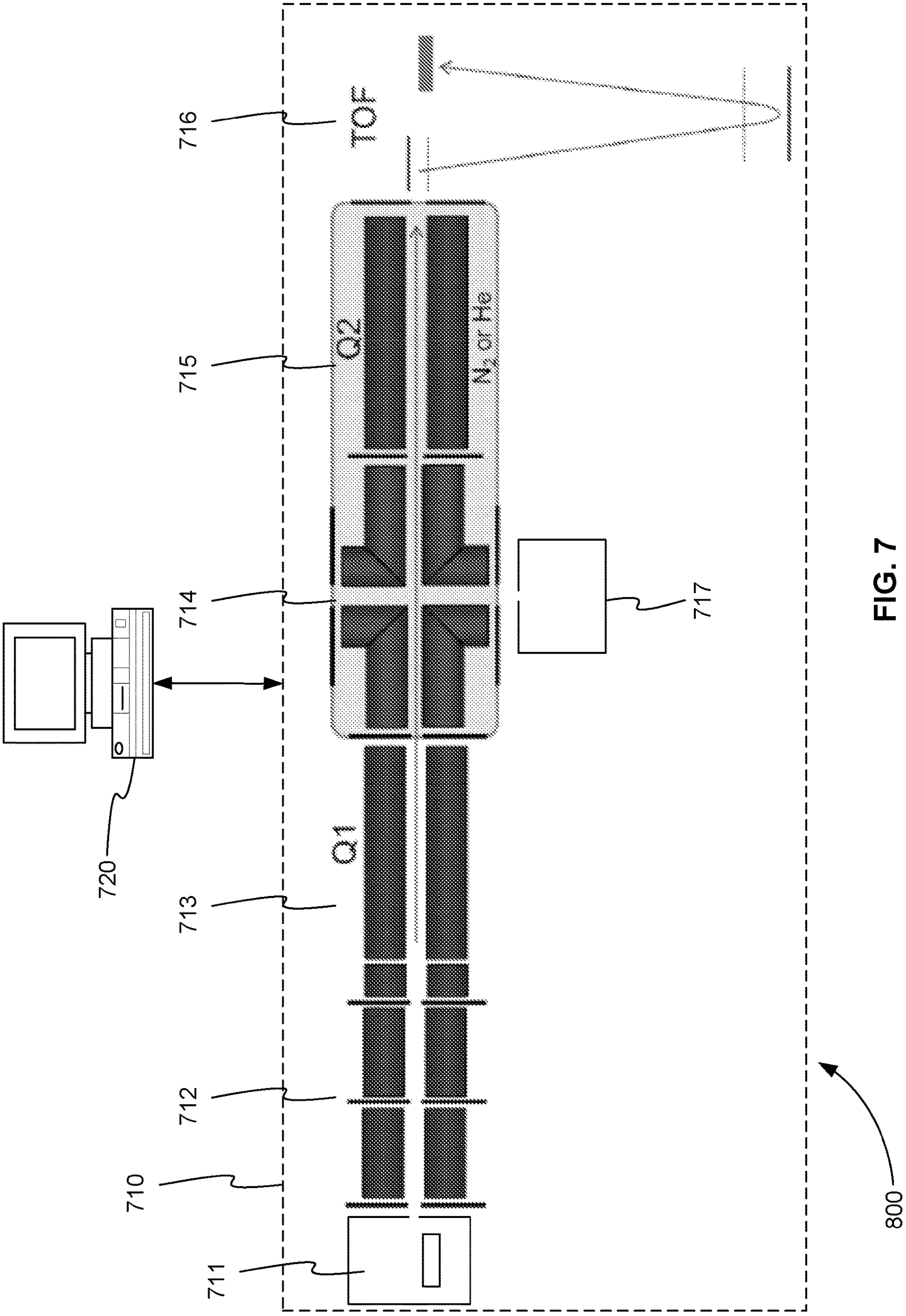
FIG. 7 is a schematic diagram of a mass spectrometry system that includes a Chimera ECD cell, in accordance with various embodiments.

FIG. 7 is a schematic diagram of a mass spectrometry system 700 that includes a Chimera ECD cell, in accordance with various embodiments. System 700 includes mass spectrometer 710 and processor 720. Processor 720 controls mass spectrometer 710 and is used to analyze the measurement data received from mass spectrometer 710. Processor 720 controls mass spectrometer 710, for example, by controlling a one or more voltage sources, one or more valves, and one or more pumps (not shown) of mass spectrometer 710.

Mass spectrometer 710 includes ion source device 711, ion guide 712, mass filter 713, Chimera ECD cell 714, CID collision cell 715, and mass analyzer 716. Conventionally, Chimera ECD cell 714 is operated in one of two modes. For MS analysis of analyte ions and for MS/MS analysis of analyte ions with CID, Chimera ECD cell 714 is operated as an ion guide. In other words, it simply receives analyte ions from mass filter 713 and transmits them to CID collision cell 715. For MS analysis of analyte ions, analyte precursor ions are mass analyzed by mass analyzer 716. For MS/MS analysis of analyte ions with CID, analyte precursor ions are fragmented by CID collision cell 715, and the resulting product ions are mass analyzed by mass analyzer 716.

For MS/MS analysis of analyte ions with ECD or electron impact excitation of ions from organics (EIEIO), Chimera ECD cell 714 is operated as a collision cell. Analyte ions are fragmented by Chimera ECD cell 714 using a low electron beam energy of about 1 eV. The resulting analyte product ions are transmitted through CID collision cell 715 and onto mass analyzer 716 for mass analysis.

Figure 8:
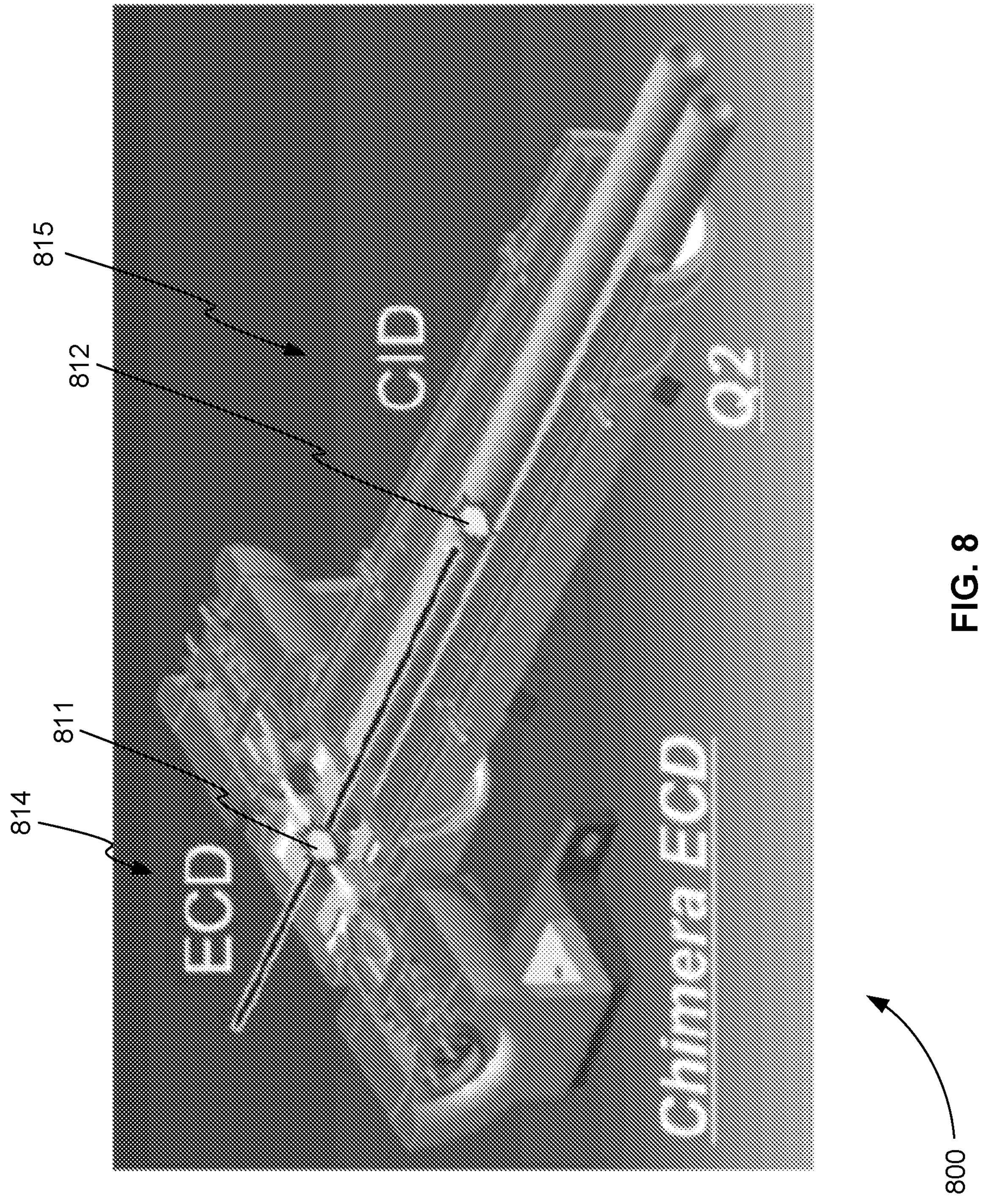
FIG. 8 is a cutaway three-dimensional perspective view of a Chimera ECD cell and CID collision cell, in accordance with various embodiments.

FIG. 8 is a cutaway three-dimensional perspective view 800 of a Chimera ECD cell and CID collision cell, in accordance with various embodiments. FIG. 8 shows that fragmentation of analyte ions selectively can be performed at location 811 in Chimera ECD cell 814 or at location 812 in CID collision cell 815.

Returning to FIG. 7, in various embodiments, Chimera ECD cell 714 is modified to include a selectable third calibration mode of operation. In this third calibration mode, analyte ions are prevented from entering Chimera ECD cell 714. Chimera ECD cell 714 is then operated to ionize a gas in Chimera ECD cell 714 using high electron beam energy of about 30 eV. In one embodiment, the gas can be a background gas, such as a component of air or a pump oil, for example. In another embodiment, the gas can be a calibration gas introduced into Chimera ECD cell 714 from calibrant source 717.

After ionization of the calibration gas, the calibrant ions are cooled in the back part of Chimera ECD cell 714 or in CID collision cell 715, just like analyte ions. Calibrant ions can be stored in CID collision cell 715 with previously received analyte ions or analyte product ions. These stored ions are then mass analyzed using mass analyzer 716 and used to calibrate the measurements of mass analyzer 716.

Because calibrant ions are ionized separately from analyte ions, this calibration mode can be used for both MS or MS/MS analysis modes. Mass analyzer 716 is shown in FIG. 7 as a TOF mass analyzer. As a result, this calibration mode can be used for both TOF-MS or TOF-MS/MS analysis modes.

TOF mass analyzers can include an ion guide for concentrating ion packets prior to mass analysis. When ion packets are concentrated so that heavier and lighter ions with the same energy meet at the extraction region of a TOF mass analyzer at substantially the same time, this is referred to as Zeno pulsing. The calibration mode of Chimera ECD cell 714 can be used to provide calibrant ions both when Zeno pulsing of TOF mass analyzer is on and when it is off.

U.S. Pat. No. 7,456,388 (hereinafter the "'388 patent") issued on Nov. 25, 2008, and incorporated herein by reference, for example, describes an ion guide for concentrating ion packets. The '388 patent provides apparatus and methods that allow, for example, analysis of ions over broad m/z ranges with virtually no transmission losses. The ejection of ions from an ion guide is affected by creating conditions where all ions (regardless of m/z) may be made to arrive at a designated point in space, such as for example an extraction region or accelerator of a TOF mass analyzer, in a desired sequence or at a desired time and with roughly the same energy. Ions bunched in such a way can then be manipulated as a group, as for example by being extracted using a TOF extraction pulse and propelled along a desired path in order to arrive at the same spot on a TOF detector.

In order to be able to operate in a calibration mode, Chimera ECD cell 714 is modified to produce an electron beam with a higher kinetic energy. As described above, this can include providing Chimera ECD cell 714 with a switchable power supply. Chimera ECD cell 714 is also modified to include means for controlling the injection of the calibration gas from calibrant source 717 into Chimera ECD cell 714 and for quickly purging calibration from Chimera ECD cell 714 after calibration. These means can include, but are not limited to, electrically controlled pumps and valves.

Although Chimera ECD cell 714 is modified to perform a calibration mode, the same electron source used for fragmentation is also used for ionization. As a result, in comparison to the apparatus of the '947 patent, the added complexity needed for calibration is reduced. Most simply Chimera ECD cell 714 serves a dual purpose and is not used solely for calibration.

Calibration Apparatus for a Mass Analyzer

Again, referring to FIG. 7, a calibration apparatus for mass analyzer 716 includes ion source device 711 and dual-purpose electron beam generating unit 714. Mass analyzer 716 can include, but is not limited to, a time-of-flight (TOF) device, a quadrupole, an ion trap, a linear ion trap, an orbitrap, a magnetic four-sector mass analyzer, a hybrid quadrupole time-of-flight (Q-TOF) mass analyzer, or a Fourier transform mass analyzer. In a preferred embodiment, mass analyzer 716 is a TOF device.

Ion source device 711 ionizes an analyte of a sample, producing analyte ions. Ion source device 711 of mass spectrometer 710 can be any ion source device that is known in the art. In various embodiments, suitable ions sources can include, but are not limited to, an electrospray ion source (ESI), an electron impact source and a fast atom bombardment source, an atmospheric pressure chemical ionization source (APCI), atmospheric pressure photoionization (APPI) source, or a matrix-assisted laser desorption source (MALDI). In a preferred embodiment, electrospray ionization is used.

Dual-purpose electron beam generating unit 714 of mass spectrometer 710 is positioned between ion source device 711 and mass analyzer 716 of mass spectrometer 710. In a first mode, when mass spectrometer 710 is in MS mode, dual-purpose electron beam generating unit 714 transmits the analyte ions to mass analyzer 716 directly or through one or more other units of mass spectrometer 710 for mass analysis.

Alternatively, in the first mode, when mass spectrometer 710 is in MS/MS mode, dual-purpose electron beam generating unit 714 fragments the analyte ions into product ions and transmits the product ions to mass analyzer 716 directly or through the one or more other units for mass analysis or transmits the analyte ions to a collision cell 715 of mass spectrometer 710 for fragmentation that, in turn, transmits resulting product ions to mass analyzer 716 for mass analysis.

Dual-purpose electron beam generating unit 714, in a second mode, creates ions of calibration compounds and transmits the calibration ions to mass analyzer 716 directly or through the one or more other units for mass analysis. Note that the one or more other units of mass spectrometer 710 can include collision cell 715.

Dual-purpose electron beam generating unit 714 can switch back and forth between the first mode and the second mode. For example, dual-purpose electron beam generating unit 714 can switch back and forth between the first mode and the second mode multiple times during a chromatographic experiment.

In various embodiments, dual-purpose electron beam generating unit 714 is an ExD cell. ExD cell 714 can be an ECD cell or an ETD cell. In a preferred embodiment, ExD cell 714 is an ECD cell. Then, in the first mode, when mass spectrometer 710 is in MS/MS mode, ExD cell 714 receives the analyte ions, fragments the analyte ions using an electron beam, producing product ions, and transmits the product ions to mass analyzer 716 directly or through the one or more other units for mass analysis. In the second mode, ExD cell 714 ionizes a gas of ExD cell 714 using the electron beam, producing calibrant ions, and transmits the calibrant ions to mass analyzer 716 directly or through the one or more other units for mass analysis.

In various embodiments, the dual-purpose electron beam generating unit 714 is an ExD cell and collision cell 714 is CID collision cell positioned between ExD cell 714 and mass analyzer 716. Then, in the first mode, when mass spectrometer 710 is in MS mode, ExD cell 714 transmits the analyte ions through CID collision cell 715 to mass analyzer 716 for mass analysis. In the second mode, ExD cell 714 creates ions of calibration compounds and transmits the calibration ions through CID collision cell 715 to mass analyzer 716 for mass analysis.

Similarly, in the first mode, when mass spectrometer 710 is in MS/MS mode, ExD cell 714 transmits the analyte ions to CID collision cell 715 that, in turn, transmits resulting product ions to mass analyzer 716 for mass analysis. In the second mode, ExD cell 714 creates ions of calibration compounds and transmits the calibration ions through CID collision cell 715 to mass analyzer 716 for mass analysis.

In various embodiments, the calibrant compounds include a background gas. The background gas can include a component of air or a component of vacuum pump oil.

In various embodiments, mass spectrometer 710 further includes gas source 717 fluidly coupled to dual-purpose electron beam generating unit 714. Gas source 717 provides the calibrant compounds to dual-purpose electron beam generating unit 714 as a gas calibrant.

In various embodiments, dual-purpose electron beam generating unit 714 ionizes a gas calibrant by applying an electron beam with a kinetic energy between 24 eV and 150 eV, in the second mode.

In various embodiments, dual-purpose electron beam generating unit 714 fragments analyte ions by applying an electron beam with a kinetic energy of less than 2 eV.

In various embodiments, the calibration apparatus further includes processor 720 for controlling ion source device 711, ExD cell 714, gas source 717, CID collision cell 715, and mass analyzer 716. Processor 720 can be, but is not limited to, a controller, a computer, a microprocessor, the computer system of FIG. 1, or any device capable of sending and receiving control signals and data to and from the components of mass spectrometer 710 and processing data.

Method for Calibrating a Mass Analyzer

Figure 9:
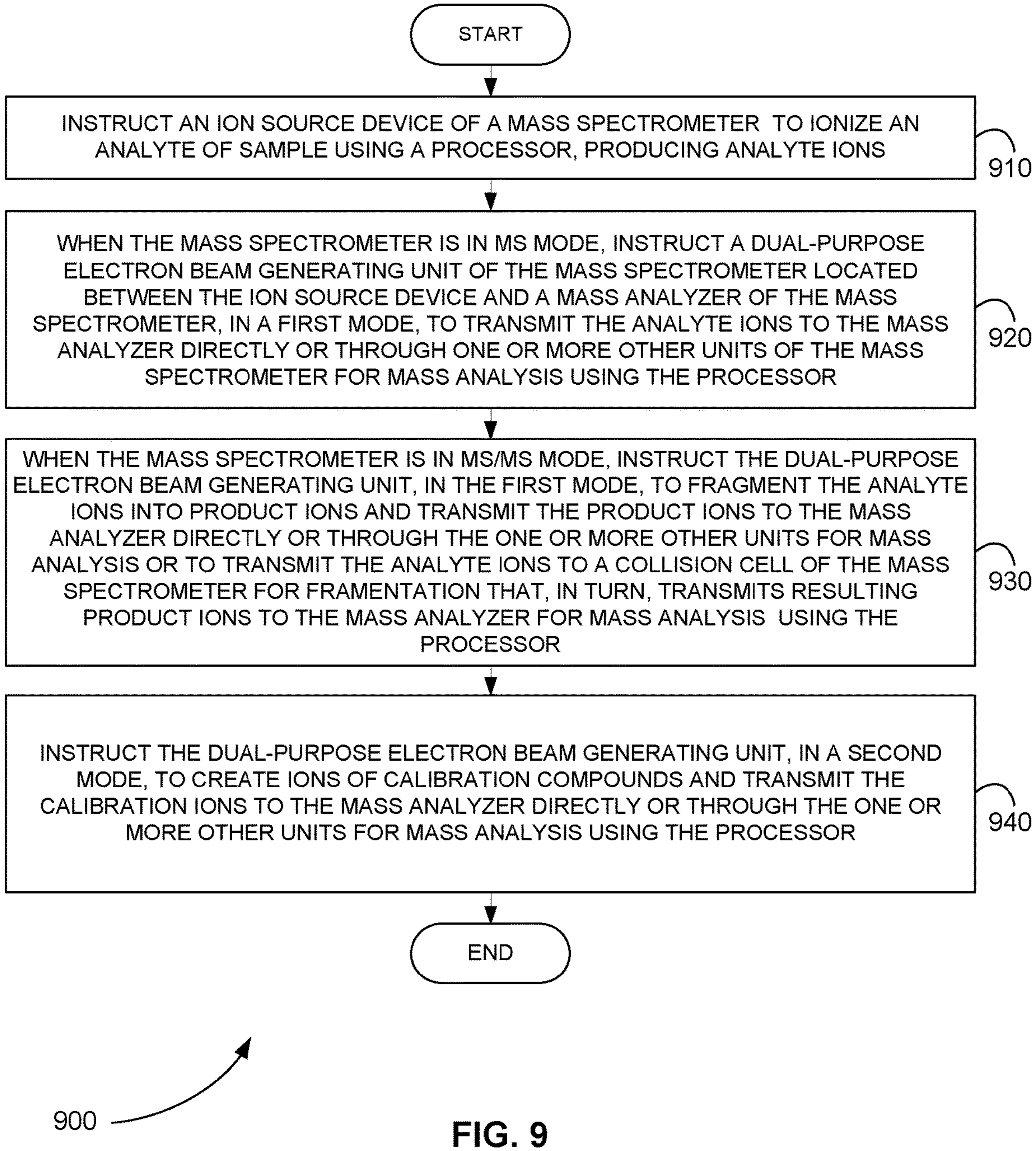
FIG. 9 is an exemplary flowchart showing a method for calibrating a mass analyzer, in accordance with various embodiments.

FIG. 9 is an exemplary flowchart showing a method 900 for calibrating a mass analyzer, in accordance with various embodiments.

In step 910 of method 900, an ion source device of a mass spectrometer is instructed to ionize an analyte of a sample using a processor, producing analyte ions.

In step 920, when the mass spectrometer is in MS mode, a dual-purpose electron beam generating unit of the mass spectrometer located between the ion source device and a mass analyzer of the mass spectrometer, in a first mode, is instructed to transmit the analyte ions to the mass analyzer directly or through one or more other units of the mass spectrometer for mass analysis using the processor.

In step 930, when the mass spectrometer is in MS/MS mode, the dual-purpose electron beam generating unit, in the first mode, is instructed to fragment the analyte ions into product ions and transmit the product ions to the mass analyzer directly or through the one or more other units for mass analysis or to transmit the analyte ions to a collision cell of the mass spectrometer for fragmentation that, in turn, transmits resulting product ions to the mass analyzer for mass analysis using the processor.

In step 940, the dual-purpose electron beam generating unit, in a second mode, is instructed to create ions of calibration compounds and transmit the calibration ions to the mass analyzer directly or through the one or more other units for mass analysis using the processor.

Computer Program Product for Calibrating a Mass Analyzer

In various embodiments, a computer program product includes a non-transitory tangible computer-readable storage medium whose contents include a program with instructions being executed on a processor so as to perform a method for calibrating a mass analyzer. This method is performed by a system that includes one or more distinct software modules.

Figure 10:
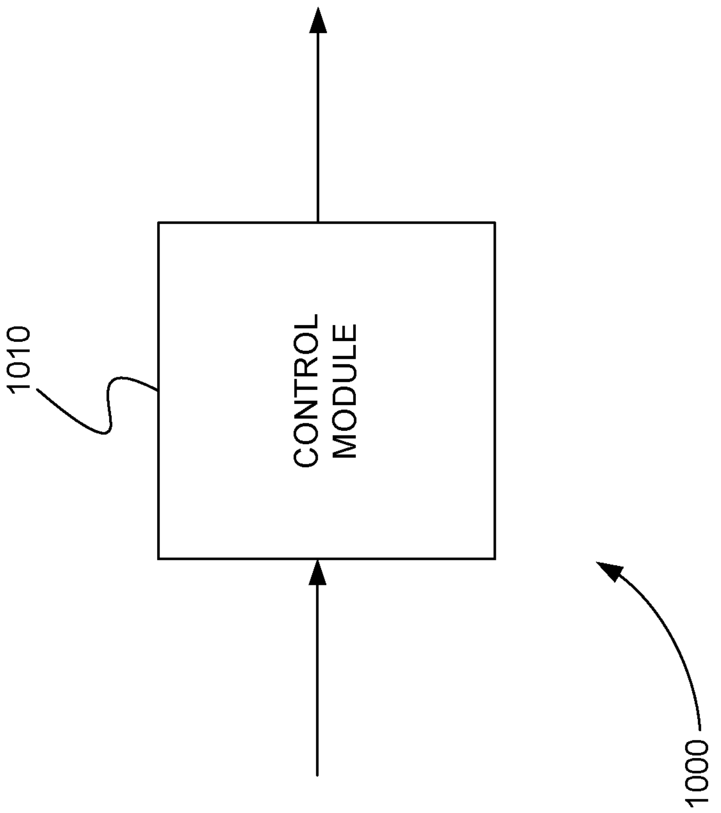
FIG. 10 is a schematic diagram of a system that includes one or more distinct software modules that performs a method for calibrating a mass analyzer, in accordance with various embodiments.

FIG. 10 is a schematic diagram of a system 1000 that includes one or more distinct software modules that perform a method for calibrating a mass analyzer, in accordance with various embodiments. System 1000 includes control module 1010.

Control module 1010 instructs an ion source device of a mass spectrometer to ionize an analyte of a sample, producing analyte ions.

When the mass spectrometer is in MS mode, control module 1010 instructs a dual-purpose electron beam generating unit of the mass spectrometer located between the ion source device and a mass analyzer of the mass spectrometer, in a first mode, to transmit the analyte ions to the mass analyzer directly or through one or more other units of the mass spectrometer for mass analysis.

When the mass spectrometer is in MS/MS mode, control module 1010 instructs the dual-purpose electron beam generating unit, in the first mode, to fragment the analyte ions into product ions and transmit the product ions to the mass analyzer directly or through the one or more other units for mass analysis or to transmit the analyte ions to a collision cell of the mass spectrometer for fragmentation that, in turn, transmits resulting product ions to the mass analyzer for mass analysis.

Control module 1010 instructs the dual-purpose electron beam generating unit, in a second mode, to create ions of calibration compounds and transmit the calibration ions to the mass analyzer directly or through the one or more other units for mass analysis using the control module.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A mass calibration apparatus for a mass analyzer, comprising:

an ion source device of a mass spectrometer for ionizing an analyte of a sample, producing analyte ions; and a dual-purpose electron beam generating unit of the mass spectrometer located between the ion source device and a mass analyzer of the mass spectrometer that, in a first mode, when the mass spectrometer is in mass spectrometry (MS) mode, transmits the analyte ions to the mass analyzer directly or through one or more other units of the mass spectrometer for mass analysis or, when the mass spectrometer is in mass spectrometry/mass spectrometry (MS/MS) mode, fragments the analyte ions into product ions and transmits the product ions to the mass analyzer directly or through the one or more other units for mass analysis or transmits the analyte ions to a collision cell of the mass spectrometer for fragmentation that, in turn, transmits resulting product ions to the mass analyzer for mass analysis, and, in a second mode, creates ions of calibration compounds and transmits the calibration ions to the mass analyzer directly or through the one or more other units for mass analysis.

2. The apparatus of claim 1, wherein the dual-purpose electron beam generating unit is an electron-based dissociation (ExD) cell, wherein, in the first mode, when the mass spectrometer is in MS/MS mode, the ExD cell receives the analyte ions, fragments the analyte ions using an electron beam, producing product ions, and transmits the product ions to the mass analyzer directly or through the one or more other units for mass analysis and, in the second mode, the ExD cell ionizes a gas of the ExD cell using the electron beam, producing calibrant ions, and transmits the calibrant ions to the mass analyzer directly or through the one or more other units for mass analysis.

3. The apparatus of claim 1, wherein the dual-purpose electron beam generating unit is an electron-based dissociation (ExD) cell, and wherein the collision cell comprises a collision-induced dissociation (CID) collision cell positioned between the ExD cell and the mass analyzer.

4. The apparatus of claim 3, wherein, in the first mode, when the mass spectrometer is in MS mode, the ExD cell transmits the analyte ions through the CID collision cell to the mass analyzer for mass analysis and, in the second mode, the ExD cell creates ions of calibration compounds and transmits the calibration ions through the CID collision cell to the mass analyzer for mass analysis.

5. The apparatus of claim 3, wherein, in the first mode, when the mass spectrometer is in MS/MS mode, the ExD cell transmits the analyte ions to the CID collision cell that, in turn, transmits resulting product ions to the mass analyzer for mass analysis and, in the second mode, the ExD cell creates ions of calibration compounds and transmits the calibration ions through the CID collision cell to the mass analyzer for mass analysis.

6. The apparatus of claim 1, wherein the calibrant compounds include a background gas.

7. The apparatus of claim 6, wherein the background gas includes a component of air or a component of vacuum pump oil.

8. The apparatus of claim 1, wherein the dual-purpose electron beam generating unit is an electron-based dissociation (ExD) collision cell, wherein the apparatus further comprises a gas source fluidly coupled to the ExD collision cell, and wherein the gas source provides the calibrant compounds to the ExD cell as a gas calibrant.

9. The apparatus of claim 8, wherein the ExD cell ionizes the gas calibrant by applying the electron beam with a kinetic energy between 24 eV and 150 eV.

10. The apparatus of claim 2, wherein the ExD cell ionizes the calibrant compounds by applying the electron beam with a kinetic energy between 24 eV and 150 eV.

11. The apparatus of claim 2, wherein the ExD cell fragments the analyte ions by applying the electron beam with a kinetic energy of less than 2 eV.

12. The apparatus of claim 1, wherein the dual-purpose electron beam generating unit is an electron-based dissociation (ExD) cell and wherein the ExD cell includes an electron capture dissociation (ECD) cell or an electron transfer dissociation (ETD) cell.

13. The apparatus of claim 8, further comprising a processor for controlling the ion source device, the ExD cell, the gas source, the CID collision cell, and the mass analyzer.

14. A method for calibrating a mass analyzer, comprising:

instructing an ion source device to ionize an analyte of a sample using a processor, producing analyte ions, instructing a dual-purpose electron beam generating unit of the mass spectrometer located between the ion source device and a mass analyzer of the mass spectrometer, in a first mode, when the mass spectrometer is in mass spectrometry (MS) mode, to transmit the analyte ions to the mass analyzer directly or through one or more other units of the mass spectrometer for mass analysis using the processor, instructing the dual-purpose electron beam generating unit, in the first mode, when the mass spectrometer is in mass spectrometry/mass spectrometry (MS/MS) mode, to fragment the analyte ions into product ions and transmit the product ions to the mass analyzer directly or through the one or more other units for mass analysis or to transmit the analyte ions to a collision cell of the mass spectrometer for fragmentation that, in turn, transmits resulting product ions to the mass analyzer for mass analysis using the processor, and instructing the dual-purpose electron beam generating unit, in a second mode, to create ions of calibration compounds and transmit the calibration ions to the mass analyzer directly or through the one or more other units for mass analysis using the processor.

15. A computer program product, comprising a non-transitory tangible computer-readable storage medium whose contents include a program with instructions being executed on a processor so as to perform a method for calibrating a mass analyzer, comprising:

providing a system, wherein the system comprises one or more distinct software modules, and wherein the distinct software modules comprise a control module;

instructing an ion source device to ionize an analyte of a sample using the control module, producing analyte ions, instructing a dual-purpose electron beam generating unit of the mass spectrometer located between the ion source device and a mass analyzer of the mass spectrometer, in a first mode, when the mass spectrometer is in mass spectrometry (MS) mode, to transmit the analyte ions to the mass analyzer directly or through one or more other units of the mass spectrometer for mass analysis using the control module, instructing the dual-purpose electron beam generating unit, in the first mode, when the mass spectrometer is in mass spectrometry/mass spectrometry (MS/MS) mode, to fragment the analyte ions into product ions and transmit the product ions to the mass analyzer directly or through the one or more other units for mass analysis or to transmit the analyte ions to a collision cell of the mass spectrometer for fragmentation that, in turn, transmits resulting product ions to the mass analyzer for mass analysis using the control module, and instructing the dual-purpose electron beam generating unit, in a second mode, to create ions of calibration compounds and transmit the calibration ions to the mass analyzer directly or through the one or more other units for mass analysis using the control module.

* * * * *